Jan. 14, 1964     W. LEHMANN     3,118,079
ELECTROLUMINESCENT CELL AND VARIABLE FREQUENCY SOURCE
FOR SELECTIVE EXCITATION OF CONTRASTINGLY-RESPONSIVE
PHOSPHOR COMPONENTS THEREOF
Original Filed Dec. 24, 1956
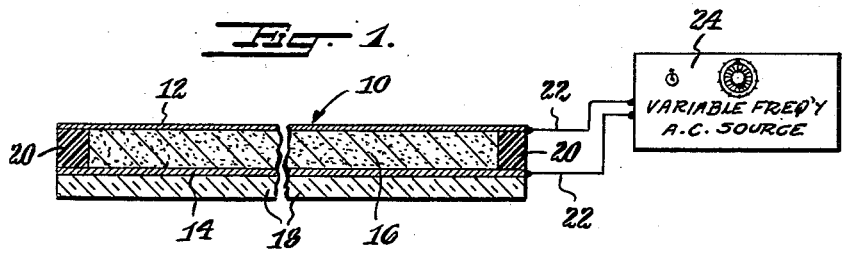
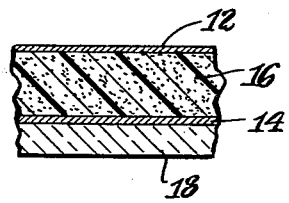
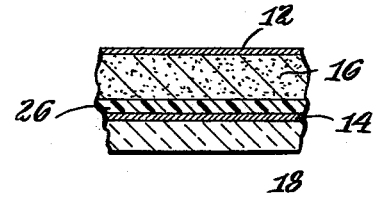
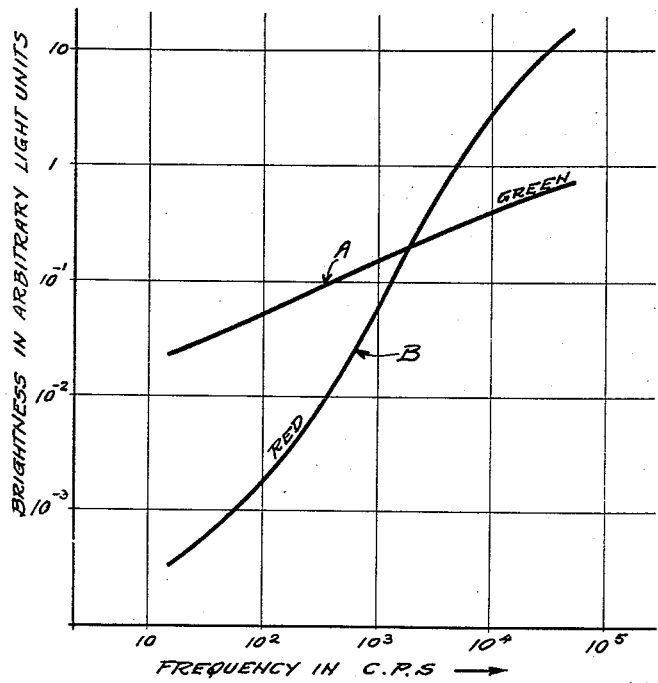
INVENTOR.
WILLI LEHMANN

United States Patent Office 3,118,079
Patented Jan. 14, 1964

3,118,079
ELECTROLUMINESCENT CELL AND VARIABLE FREQUENCY SOURCE FOR SELECTIVE EXCITATION OF CONTRASTINGLY-RESPONSIVE PHOSPHOR COMPONENTS THEREOF
Willi Lehmann, Livingston, N.J., assignor to Westinghouse Electric Corporation, Pittsburgh, Pa., a corporation of Pennsylvania
Continuation of application Ser. No. 630,355, Dec. 24, 1956. This application Dec. 27, 1961, Ser. No. 164,206
4 Claims. (Cl. 313—108)

This invention relates to electroluminescent cells and, more particularly, to a single-layer electroluminescent cell which is energizable to electroluminescence in more than one color.

This application is a continuation of application S.N. 630,355, filed December 24, 1956, now abandoned, and owned by the present assignee.

Electroluminescent cells are generally well known and were first summarized completely in London, Edinburgh and Dublin Philosophical Magazine, Series 7, volume 38, No. 285, pages 700–737 (October 1947) article by G. Destriau titled "The New Phenomenon of Electrophotoluminescence." In the phenomenon of electroluminescence, selected phosphor materials are placed within the influence of an electric field, such as by sandwiching the phosphor between two spaced electrodes and applying an alternating potential between these electrodes. The resulting electric field which is created across the electrodes excites the phosphor material to luminesce and phosphor materials which display this electroluminescence are thus termed "field-responsive."

For some applications, it is desirable to provide electroluminescent cells which will display more than one color. This can be achieved by superimposing individual cells as disclosed in Patent No. 2,730,644 to Michlin wherein each individual superimposed layer may be energized separately to electroluminesce in a different color. There are many applications, however, where the electroluminescent material cannot be used in separate layers and must still display different colors. One such application is described in copending patent application of Henry F. Ivey, S.N. 630,356, filed December 24, 1956, titled "Electroluminescent Device," and owned by the present assignee.

Electroluminescent phosphors which will respond in two different colors in response to applied fields of different frequencies are known. For example, the emission color of certain zinc sulfide phosphors which are activated by copper and coactivated by chlorine is green when excited by fields of low frequencies and blue when excited by fields of very high frequencies. In all known cases, however, where the single electroluminescent phosphor may be excited by fields of different frequencies to emit different colors, the color change is quite weak and there is very little contrast between the two colors. In addition, the transition from one color to the other color is only apparent when the cell is excited by fields of widely divergent frequencies, such as 180 cycles and 10 kilocycles. This introduces additional problems with respect to the energizing source.

In order to overcome the foregoing and other difficulties of and objections to the prior art, it is the general object of this invention to provide a single-layer electroluminescent cell which can be energized to display sharply contrasting colors.

It is a further object of this invention to provide a single-layer electroluminescent cell which can be energized to emit sharply contrasting colors when varying the frequency of the exciting electric field a relatively small amount.

The aforesaid objects, and other objects which will become apparent as the description proceeds, are achieved by providing a single-layer electroluminescent cell wherein the phosphor comprises an admixture of two different phosphors. The first of the admixed phosphors responds to an energizing electric field of relatively low frequency to produce an individual color. The second of the admixed phosphors responds to an energizing electric field of relatively high frequency to produce an individual color which sharply contrasts with that color produced by the first phosphor when excited by the field of low-frequency. The low-frequency-response phosphor electroluminesces more brightly than the high-frequency-response phosphor when the admixture is energized by fields of relatively low frequency and the converse is true when the phosphor admixture is energized by fields of relatively high frequency; that is, the phosphor which responds better to the high-frequency field-excitation will produce a bright color when energized by relatively high-frequencies fields which will override that color produced by the first phosphor.

For a better understanding of the invention, reference should be had to the accompanying drawing wherein:

FIG. 1 is an enlarged sectional elevation of an electroluminescent cell embodying the phosphor admixture;

FIG. 2 is a fragmentary sectional enlargement of an alternative embodiment of the cell construction shown in FIG. 1;

FIG. 3 is a fragmentary sectional enlargement of a further alternative embodiment of the cell construction shown in FIG. 1;

FIG. 4 is a graph of brightness vs. applied frequency illustrating the performance for one specific phosphor admixture.

With specific reference to the form of the invention illustrated in the drawing, the numeral 10 indicates generally an electroluminescent cell comprising two spaced electrodes 12 and 14 having sandwiched therebetween the admixed electroluminescent phosphors 16. Normally, one of the electrodes constitutes a viewing face and, as a specific example, the electrode 12 is formed of an electrically conductive and light transmissive layer of tin oxide, which layer can be applied onto a glass plate by means such as described in Patent No. 2,522,531 to Mochel. Other well-known methods for applying such coatings may be utilized and other thin light-transmissive and electrically conductive materials may be substituted for the tin oxide, if desired, such other materials being well known. The other electrode 14 is formed by vacuum-metallizing aluminum, for example, or it can be fabricated of tin oxide, if desired. An additional foundation plate 18 of glass or other rigid material may be used to supply rigidity to the cell 10, although such an additional foundation plate is not necessary. Spacing between the electrodes 12 and 14 can be accomplished by plastic spacing members 20 of a thickness of two mils, for example. Normally the electrodes 12 and 14 will be parallel so that the electric field between the two electrodes will be uniform, but if graded fields are desired, the electrodes need not be parallel. Each electrode is adapted to have connected thereto electrical-connecting leads 22 as is usual. A source of variable-frequency alternating potential 24 is adapted to be connected across the connecting leads 22 to supply energization for the cell 10 and such sources are well known.

The admixed phosphor materials 16 can be placed between the electrodes without any other material additives, although it is desirable for most applications to admix with the phosphors a light-transmitting dielectric material in order to prevent arcing or electrical breakdown across the electrodes. Such a construction is illustrated in FIG. 2 and as a specific example, the admixed dielectric material comprises light-transmitting polyvinyl-chloride acetate with the ratio by weight of phosphor to dielectric being 1 to 1, for example. Other suitable dielectric materials can be admixed with the phosphor, as is well known, and the ratio of dielectric to phosphor can vary over a wide range.

Alternatively, the phosphor and dielectric material can be sandwiched between the electrodes in separate layers and such an embodiment is shown in FIG. 3 wherein a separate layer of dielectric material 26 is placed adjacent the electrode 14. Such a dielectric material can comprise a thin sheet of mica of a thickness of one mil, for example. If desired, the phosphor can be admixed with a dielectric material, as indicated hereinbefore, and a separate layer of dielectric material also utilized.

The admixed phosphors 16 should be so selected that one of the admixed phosphors will have a good electroluminescent response when excited by a field of relatively low frequency and the other admixed phosphor will have a good electroluminescent response when excited by a field of a relatively high frequency and so that the response of the second phosphor will override the response of the first phosphor when these admixed phosphors are excited by the electric fields of relatively high frequencies.

As a specific example, zinc-sulfide phosphor which is activated by manganese will produce a bright yellow electroluminescence when excited by a relatively low frequency such as 200 cycles and will display a brightness which increases relatively slowly with increasing frequency of the field excitation. Such a phosphor can be prepared by admixing 100 grams of finely divided zinc sulfide with 5 grams of finely divided zinc oxide, 0.8 gram copper sulphate and 2 grams of manganous acetate. This admixture is fired at 1100° C. for 1 hour in an open crucible in an atmosphere comprising sulphur vapor.

Zinc sulfide, activated by copper and coactivated by chlorine and having an addition of zinc oxide is a green-emitting phosphor which has excellent brightness when excited by fields of relatively low frequencies and a slowly increasing brightness when excited by fields of increasing frequencies. Such a phosphor can be prepared by admixing 75 grams of finely divided zinc sulfide with 25 grams of finely divided zinc oxide and 0.1 gram of copper chloride. This admixture is fired in a covered crucible standing in air at 950° C. for 1 hour.

Zinc sulfide, activated by copper and coactivated by chlorine and having an addiiton of cobalt is a phosphor which has an excellent brightness in the green region of the visible spectrum when excited by fields of relatively high frequency and a very poor brightness when excited by fields of low frequency. Such a phosphor can be prepared by admixing 100 grams of finely divided zinc sulfide with 0.8 gram of copper chloride, 1 gram potassium chloride and 0.003 gram cobalt chloride. This admixture is fired at 900° C. in a covered crucible standing in air for 1 hour.

As a further specific example, a zinc selenide activated by copper and coactivated by chlorine displays an excellent brightness in the red region of the visible spectrum when excited by fields of relatively high frequency and a relatively poor brightness when excited by fields of relatively low frequency. This phosphor can be prepared by admixing 100 grams of finely divided zinc selenide with 0.5 gram of copper chloride and the admixture is fired in covered crucibles standing in air at 850° C. for 1 hour. All of the foregoing phosphor examples may be washed in a one-normal solution of potassium cyanide after firing if it is desired to enhance their electroluminescent output.

In order to achieve various color combinations, the high-frequency-field, red-responding zinc selenide, copper activated phosphor can be admixed with the low-frequency-field, green-responding zinc sulfide-xinc oxide, copper-activated phosphor to produce a single layer-cell, as illustrated in FIGS. 1, 2, or 3, which cell will respond with a green-emission color when excited by an electric field of a frequency of 200 cycles and with a red-emission color when excited by an electric field of a frequency of 5 kc.s. In FIG. 4 is shown the performance of such a phosphor admixture wherein brightness (in arbitrary light units) is plotted vs. applied frequency. As shown, the green-emitting phosphor (curve A) has a relatively good output at low field-frequency excitation. The red-emitting zinc selenide phosphor has a very poor brightness at relatively low field frequencies (curve B), but the brightness increases very rapidly with increasing frequency so that when the frequency of the exciting field exceeds about 1.75 kc., the red emission will be brighter than and override the green emission and the phosphor admixture will appear red.

In the foregoing specific admixture, about one part by weight of the green-emitting zinc sulfide, copper-activated phosphor is admixed with four to five parts by weight of the red-emitting zinc selenide-copper activated phosphor, although this ratio may be varied over a ride range depending on the frequency where it is desired that the cell change color. While the brightness of the red-emitting phosphor, when excited by the fields of high frequency, will exceed the brightness of the green-emitting phosphor, when excited by the fields of low frequency, this difference in brightness may be compensated by decreasing the applied voltage at the high-frequency field excitation, if it is desired to have the different colors appear in the same brightness.

As a further specific example, about one part by weight of the low-frequency-field, yellow-emitting zinc-sulfide, manganese-activated phosphor can be admixed with four to five parts by weight of the high-frequency-field, red-emitting zinc-selenide, copper-activated phosphor to produce a red-yellow combination.

As still another specific example, about one part by weight of the low-frequency-field, yellow-emitting zinc sulfide-zinc oxide, copper- and manganese-activated phosphor can be admixed with four to five parts by weight of the high-frequency-field, green-emitting zinc-sulfide, copper-activated phosphor with the addition of cobalt. In all of the examples, the ratio by weight of the admixed phosphors may be varied over a wide range.

The performance characteristics for all of the foregoing specific examples will be generally similar to the performance characteristics for the red-green admixture, which is shown in FIG. 4. The foregoing examples thus include multicolor cells which will produce sharply contrasting colors of red-green, red-yellow and green-yellow when excited by fields of varying frequencies. In all of the foregoing examples, electric fields of a frequency of 200 cycles at the lower end and 5 kc.s. at the upper end will cause the admixed phosphors to display sharply contrasting colors and the frequencies of the exciting fields may be varied considerably.

While specific examples have been illustrated and described in detail, it should be clear that various other phosphor admixtures can be utilized where one of the phosphors of the admixture is relatively bright when excited by fields of relatively low frequency, which brightness increases slowly with increasing frequency, while the other phosphor of the admixture displays a relatively poor brightness when excited by fields of relatively low frequencies, but displays a rapidly increasing brightness as the frequency of the exciting field is increased.

It will be recognized that the objects of the invention have been achieved by providing a single-layer electroluminescent cell which can be energized to emit sharply contrasting colors by varying the frequency of the field excitation and this field-excitation frequency need only be varied a relatively small amount to produce contrasting colors.

While one best embodiment of the invention has been illustrated and described in detail, it is to be particularly understood that the invention is not limited thereto or thereby.

I claim as my invention:

1. The combination which comprises:
   (A) a source of alternating electric potential having an output of variable frequency, a relatively low frequency electric potential constituting one output of said source, and a relatively high frequency electric potential constituting another output of said source;
   (B) an electroluminescent cell comprising, spaced electrodes at least one of which is light transmitting, and a mixture of predetermined amounts of two different electroluminescent phosphors included between said spaced electrodes;
   (C) means for selectively applying a desired one of said outputs of said source across said spaced electrodes of said cell, a relatively high frequency electric field imposed across said mixed phosphors by application of said relatively high frequency alternating electric potential across said spaced electrodes, and a relatively low frequency electric field imposed across said mixed phosphors by application of said relatively low frequency alternating electric potential across said spaced electrodes;
   (D) said source and said cell cooperating in the following manner, one of said mixed phosphors responding to excitation by said relatively low frequency electric field to electroluminesce to produce an individual color, the other of said mixed phosphors responding to excitation by said relatively high frequency electric field to produce an individual color which sharply contrasts with the color in which said one phosphor electroluminesces when energized by said relatively low frequency electric field, said one phosphor electroluminescing more brightly than said other phosphor when said mixed phosphors are energized by said relatively low frequency electric field, and said other phosphor electroluminescing more brightly than said one phosphor when said mixed phosphors are energized by said relatively high frequency electric field.

2. The combination as specified in claim 1, wherein said mixed phosphors are embedded in light-transmitting dielectric material and included between said spaced electrodes.

3. The combination as specified in claim 1, wherein an additional layer of dielectric material is also included between said spaced electrodes.

4. The combination which comprises:
   (A) a source of alternating electric potential having an output of variable frequency, a 200 c.p.s. electric potential constituting one output of said source, and a 5,000 c.p.s. electric potential constituting another output of said source;
   (B) an electroluminescent cell comprising, spaced electrodes at least one of which is light transmitting, a phosphor mixture of one part by weight of a first electroluminescent phosphor and from four to five parts by weight of a second electroluminescent phosphor included between said spaced electrodes, said first phosphor consisting of three parts by weight of zinc sulfide and one part by weight of zinc oxide and activated by copper and coactivated by chlorine, and said second phosphor consisting of zinc selenide activated by copper and coactivated by chlorine;
   (C) means for selectively applying a desired one of said outputs of said source across said spaced electrodes of said cell, a 5,000 c.p.s. alternating electric field imposed across said mixed phosphors by application of said 5,000 c.p.s. alternating electric potential across said spaced electrodes, and a 200 c.p.s. alternating electric field imposed across said mixed phosphors by application of said 200 c.p.s. alternating electric potential across said spaced electrodes;
   (D) said cell and said source cooperating in the following manner, said first of said mixed phosphors responding to excitation by said 200 c.p.s. alternating electric field to electroluminesce to produce a green emission, said second of said mixed phosphors responding to excitation by said 5,000 c.p.s. alternating electric field to produce a red emission, said first phosphor electroluminescing more brightly than said second phosphor when said mixed phosphors are energized by said 200 c.p.s. alternating electric field, and said second phosphor electroluminescing more brightly than said first phosphor when said mixed phosphors are energized by said 5,000 c.p.s. alternating electric field.

References Cited in the file of this patent

UNITED STATES PATENTS

| | | |
|---|---|---|
| 2,660,566 | Froelich | Nov. 24, 1953 |
| 2,698,915 | Piper | Jan. 4, 1955 |
| 2,733,367 | Gillson | Jan. 31, 1956 |
| 2,813,223 | Kaifaian | Nov. 12, 1957 |